United States Patent [19]

Shedd

[11] Patent Number: 4,547,827

[45] Date of Patent: Oct. 15, 1985

[54] POWER SURGE ISOLATOR

[76] Inventor: Harold E. Shedd, Rt. 1, Box 242, Suni-Pines Park, Nicholson, Ga. 30565

[21] Appl. No.: 510,668

[22] Filed: Jul. 5, 1983

Related U.S. Application Data

[63] Continuation-in-part of Ser. No. 467,947, Feb. 18, 1983, Pat. No. 4,500,862.

[51] Int. Cl.[4] .............................................. H02H 3/20

[52] U.S. Cl. ....................................... 361/55; 361/56; 361/91; 361/104

[58] Field of Search .................................... 361/54–56, 361/91, 104, 110, 111, 127, 349, 430; 337/28, 31, 33, 197, 221, 282

[56] References Cited

U.S. PATENT DOCUMENTS

| | | | |
|---|---|---|---|
| 662,466 | 11/1900 | Sachs | 361/124 X |
| 894,705 | 7/1908 | Schattner | 361/55 |
| 1,171,166 | 2/1916 | Brach | 361/127 |
| 1,754,709 | 4/1930 | Brach | 361/127 |
| 3,493,815 | 2/1970 | Hurtle | 361/104 X |
| 3,539,961 | 11/1970 | Worthington | 337/282 X |
| 3,840,781 | 10/1974 | Brown | 361/104 |
| 4,075,676 | 2/1978 | Phillips, Jr. | 361/56 |

*Primary Examiner*—Harry E. Moose, Jr.

*Attorney, Agent, or Firm*—Newton, Hopkins & Ormsby

[57] ABSTRACT

A self-contained fused unit for the protection of electrical appliances against damage caused by abnormal power surges is disclosed. Fuses are selected so that the proper amperage required to operate any appliance can be delivered through the power surge isolator while full protection of the appliance against abnormal power surges is provided. Varistors connected between terminals of the device augment the protective action of fuses in the event that certain kinds of power surges are encountered which are so fast that fuses may not blow in time to protect the appliance. In such cases, the instantly decreased resistance in the varistors assures grounding of the excessive current without damage to the appliance occurring.

1 Claim, 5 Drawing Figures

POWER SURGE ISOLATOR

CROSS-REFERENCE TO RELATED APPLICATION

This application is a continuation-in-part of application Ser. No. 467,947, filed Feb. 18, 1983, for POWER SURGE ISOLATOR, now U.S. Pat. No. 4,500,862.

BACKGROUND OF THE INVENTION

The objective of the present invention is to improve on the protective ability or efficiency of the power surge isolator disclosed in the referenced prior application.

It has been found that, occasionally, certain types of excessive power surges can be so fast that they may reach the electrical appliance circuit and damage the same before the protective fuses in the power surge isolator have time to blow.

The present invention deals with this particular problem by augmenting the action of the fuses with a varistor or varistors replaceably connected between positive and negative terminals of the power surge isolator in such a manner that even the occasional abnormal power surges which are so fast that they may bypass the fuses are diverted safely to ground through the varistor or varistors whose resistance or resistances decreased instantly in response to an increase in voltage through the circuit in which they are connected. By employing varistors in conjunction with fuses, according to the present invention, appliances can be protected from damage due to power surges of all conceivable kinds and intensities.

Other objects and advantages of the invention will become apparent during the course of the following detailed description.

DETAILED DESCRIPTION

Figure 1:
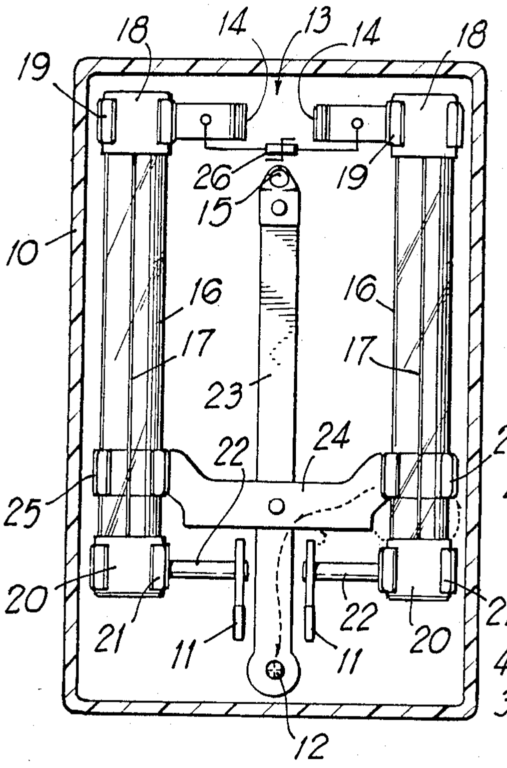
FIG. 1 is a front elevation, partly in section, of an improved power surge isolator according to one preferred embodiment of the invention.

Referring to the drawings in detail, wherein like numerals designate like parts, FIG. 1 depicts a power surge isolator unit particularly for 110 volt appliances including many smaller appliances used in the home. As disclosed in the prior application, the unit is enclosed in a housing 10 of insulating material and near one end includes a pair of projecting power prongs 11 and a grounding prong 12 in the customary triangular array for reception in any female household wall receptacle.

Near its opposite end, the power surge isolator unit includes a female receptacle 13 adapted to receive therein the conventional three pronged plug, not shown, on the power cable of a particular appliance. The receptacle 13 includes a pair of power contact strips 14, and a grounding sleeve 15. The contact strips 14 engage the two power prongs of the appliance plug and the sleeve 15 receives therein the ground prong of such plug.

A pair of appliance safeguarding fuses 16 of conventional construction having fusible elements 17 include a pair of terminals 18 at corresponding ends thereof, held by contact clips 19 integrally connected with the strips 14. Similarly, at their other ends, fuses 16 have end terminals 20 held by contact clips 21 on bars 22 connected with the power prongs 11.

As disclosed in the prior application, the two ground terminals 12 and 15 are connected within the housing 10 by a ground strip 23, attached to and electrically connected with a grounding power stop 24 extending transversely across the ground strip 23 and having end clips 25 which embrace the glass envelopes of fuses 16 near but spaced from fuse terminals 20.

In accordance with the improvement of this invention, a varistor 26 is connected across the two power contact strips 14. This element is of the type described in column 5 of U.S. Pat. No. 4,191,985, issued to Phillips, Jr. The varistor is an element whose resistance decreases with an increase in voltage applied thereto.

Under normal power supply conditions, the replaceable fuses 16 are chosen to deliver the proper current value and voltage to a given appliance to enable normal operation thereof. When abnormal power surges of the kinds most frequently experienced act on the 110 volt power circuit into which the prongs 11 and 12 are plugged, the fuses 16 will blow to isolate the appliance circuit from the surge. The surging current as shown by the broken directional arrows in FIG. 1 will arc or jump from terminals 20 to clips 25 and will pass through the power stop 24 and ground strip safely to ground through terminal 12, thus protecting the appliance circuit.

When the more infrequent type of power surge of an extremely fast type is encountered, where the fuses 16 might not blow quickly enough to protect the appliance, the varistor 26 comes into play and has its resistance value instantly decreased under the abnormally high voltage, whereby the current flowing between the positive and negative terminals 14 passes through the varistor 26 rather than through the appliance circuit or goes to ground. That is to say, excessive current which would damage the appliance circuit is prevented from going to such circuit through the power terminals 14 because of the presence of the varistor 26 whose resistance drops allowing the excessive current to pass through it.

Under normal voltage delivered by the 110 volt power circuit to the terminals 11, or prongs, the resistance value of varistor 26 remains maximum and no current can pass through the varistor, and instead flows normally through the power terminals 14 to the appliance circuit. Thus, the fuses 16 protect the appliance under most excessive power surges but in the case of surges which are too fast for the fuses, the varistor prevents these surges from damaging the appliance.

Figure 2:
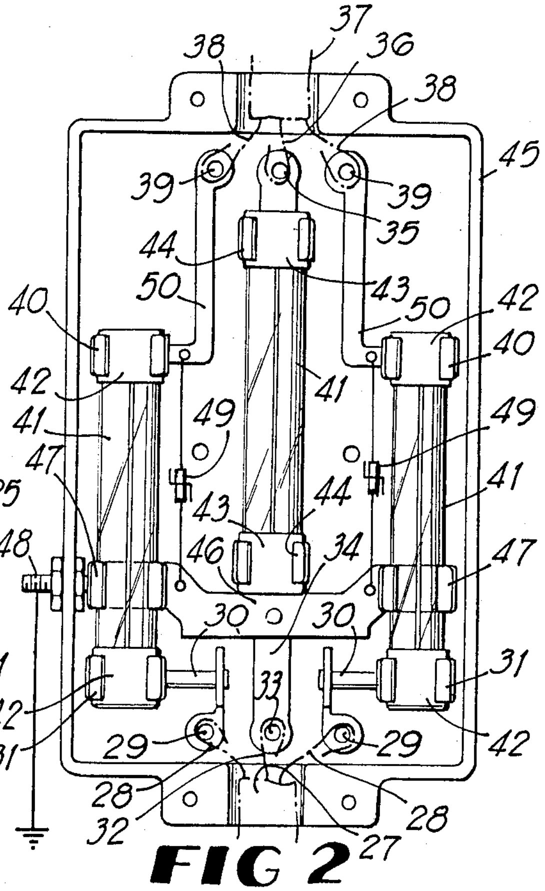
FIG. 2 is a similar view showing a second embodiment of the invention applicable to 220 volt appliance circuits.

In the embodiment of the power surge isolator shown in FIG. 2 for 220 volt appliances, a power supply cable 27 has its two power conductors 28 connected to power terminals 29 secured to bar conductors 30 carrying conductor clips 31. The neutral conductor 32 of power cable 27 is similarly connected to a terminal 33 of a grounding strip 34 having another terminal 35 at its opposite end connected to the neutral or ground conductor 36 of an appliance cable 37. The two power conductors 38 of the appliance cable are connected to power terminals 39 carrying terminal clips 40.

Three fuses 41 are employed in the power surge isolator of FIG. 2. The outer pair of fuses have their opposite end terminals 42 held by the conducting clips 31 and 40, as shown. The center fuse 41 has its end terminals 43 held by clips 44 which are secured directly to the grounding strip 34. All of the above elements are held inside of an insulating shell or housing 45.

A grounding power stop 46 similar to the power stop 24 is attached to the grounding strip 34 transversely thereof and has end clips 47 which embrace the envelopes of fuses 41 near but spaced from their terminals 42 and clips 31. An additional ground connection 48 is preferably provided for the power stop 46 through one of its clips 47.

In accordance with the improvement, a pair of varistors 49 are connected between terminal strips 50 leading from the power terminals 39 of opposite polarity and the grounding power stop 46.

Under normal 220 volt power supply conditions, the power surge isolator delivers the proper level of operating current and voltage to the appliance cable 37. When the most common excess power surges are encountered, the fuses 41 protect the appliance circuit in the normal manner described in the prior application and in connection with the prior embodiment of the invention herein. When the unusual extremely fast power surges of the type which could reach the appliance circuit before the fuses blow are encountered, the varistors 49 come into play by having their normal resistance values decreased, thereby causing the excessive current to be grounded instead of entering the circuit of the appliance and damaging or blowing out such circuit. Under normal current and voltage conditions, the high resistances of varistors 49 prevent any current from passing therethrough, so that the particular appliance is properly powered.

It may be seen that the embodiments of the invention in FIGS. 1 and 2 function in essentially the same manner to protect electrical appliances regardless of what type power surge is experienced. If an extremely fast acting surge does reach the varistors, by the time they respond and protect the appliance circuit, the fuses 16 or 41 will have blown to completely shut off all power. Like the fuses themselves, the varistors 26 and 49 are removably plugged into the device so that in the event they are damaged, they can be easily replaced by a layman. The values or sizes of the fuses and varistors chosen depend on requirements for protecting a given appliance, as explained in the prior application.

Figure 3:
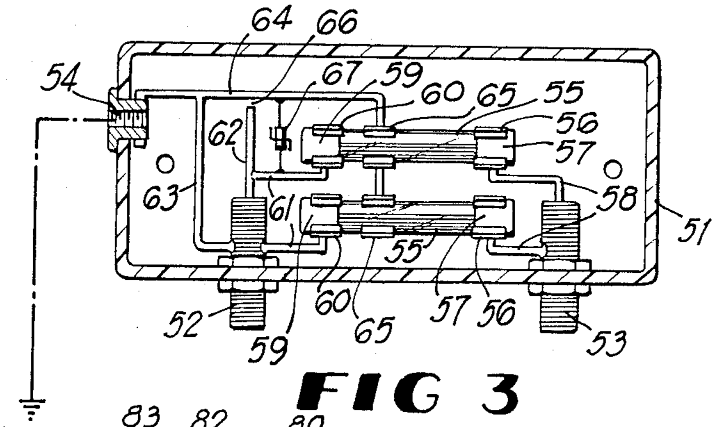
FIG. 3 is a similar view of an alternative embodiment of the invention for use with electrical appliances which have antennas.
Figure 4:
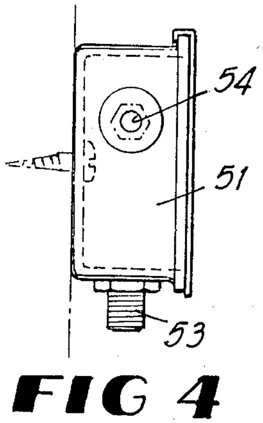
FIG. 4 is a side elevation of the device shown in FIG. 3.

FIGS. 3 and 4 show a further embodiment of the invention used to protect television receivers, CB radios and other appliances having antennas. In these figures, the power surge isolator includes an insulating housing 51 carrying 75 ohm connections 52 and 53 for an antenna circuit. One wall of the housing 51 mounts a ground wire connector 54.

Within the housing, a pair of fuses 55 are held at corresponding ends by clips 56 which electrically engage fuse terminals 57 and are connected through conductors 58 with one of the 75 ohm connections 53. The opposite end terminals 59 of fuses 55 are held by clips 60 which are connected by conductors 61 with the 75 ohm antenna connection 52.

One of the connectors 58 is electrically isolated from the outside rim, ground part, of antenna connection 53, while the other conductor 58 is electrically connected to the outside rim, ground part, of connection 53 as shown in FIG. 3. Similarly, one of the conductors 61 attached to an electrode 62 is electrically isolated from the rim or outside ground part of antenna connection 52, while the other conductor 61 is connected to the outside ground part of connection 52. This part of connection 52 is further electrically connected through a conductor 63 with a grounding power stop 64 leading from ground wire connector 54 to clips 65 which embrace the glass envelops of fuses 55 near but spaced from their terminals 59. Electrode 62 has its tip spaced from the grounding power stop 64 by a preset spark gap 66.

In accordance with the improvement herein, a varistor 67 is connected between the grounding power stop 64 and the adjacent conductor 61 in the region between electrode 62 and the adjacent fuse terminal 59.

The device in FIGS. 3 and 4 affords the same protection and isolation to an appliance, such as a television receiver, from power surges as do the previous embodiments of the invention. Current to the appliance power circuit is delivered through the connection 53. The fuses 55 allow normal operating current to enter the appliance circuit and protects such circuit by blowing in response to power surges of the kind usually encountered.

If an unusual extremely fast power surge capable of reaching the appliance before the fuses 55 are blown is encountered, then, the varistor 67 protects the appliance circuit by allowing the excessive or damaging current to pass through it, as previously explained in the prior two embodiments of the invention.

Figure 5:
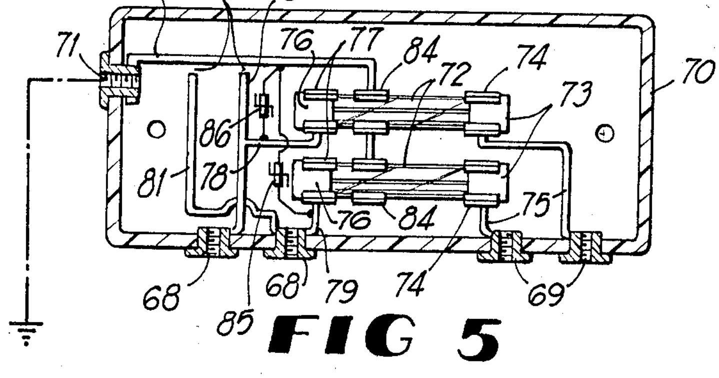
FIG. 5 is a view similar to FIG. 3 depicting another alternative embodiment of the invention.

FIG. 5 shows a variant of the device in FIGS. 3 and 4 for antenna equipped appliances with 300 ohm connections 68 and 69. The housing 70 of the device has a grounding terminal 71 for connection with a ground wire. Two fuses 72 have their end terminals 73 held in clips 74. These clips are connected by conductors 75 with the connection 69. The other end terminals 76 of fuses 72 are held in clips 77 connected through conductors 78 and 79 with electrodes 80 and 81 connected with antenna connection 68. Spark gaps 82 exist between the tips of the electrodes 80 and 81 and a grounding power stop 83 connected between the grounding terminal 71 and clips 84 which embrace the envelopes of fuses 72 near but spaced from their end terminals 76.

Two varistors 85 and 86 have corresponding terminals connected with grounding power stop 83 and conductors 78 and 79, as shown in FIG. 5.

The mode of operation of the unit in FIG. 5 is essentially the same as previously described for the other embodiments and will not be repeated. The unit is effective to protect antenna equipped appliances from damage caused by any and all types of power surges.

The advantages of the invention over the prior application and the prior art in general should now be apparent to those skilled in the art without the necessity for any further description herein.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A power surge isolator for the protection of electrical appliance circuits comprising an insulating housing having opposite end inlet openings for a three conductor power cable and a three conductor appliance cable, a pair of power supply terminal strips within said housing and being electrically connected at corresponding ends with two conductors of the power cable of opposite polarities and carrying conducting clips at their other corresponding ends, terminal elements within the housing near its end adjacent to the appliance cable and being electrically connected with two conductors of the appliance cable of opposite polarities and being equipped with conductor clips spaced coaxially from the conductor clips of the power supply terminal strips, a pair of fuses having opposite end electrical terminals engaged releasably within the conductor clips of the power supply terminal strips and said terminal elements, a central longitudinal grounding strip within the housing extending substantially between the opposite end inlet openings and being electrically connected to ground conductors of the power cable and appliance cable, a pair of conductor clips on said grounding strip in longitudinally spaced relationship, one of said last-named clips being spaced substantially from the inlet opening for the appliance cable and said terminal elements, a single fuse within said housing having opposite end electrical terminals which are held by the terminal clips of said grounding strip, a grounding power stop strip attached to and extending transversely of the longitudinally extending grounding strip and extending beyond opposite sides of said grounding strip and having opposite end conductor clips embracing insulating envelopes of said pair of fuses near and in spaced relationship to the conductor clips of said terminal elements, a pair of varistors electrically connected between said pair of power supply terminal strips and said transverse power stop strip, and an additional ground terminal extending exteriorly of the insulating housing and being electrically connected with the grounding power stop strip through one of its end conductor clips.

* * * * *